(12) United States Patent
Liang et al.

(10) Patent No.: US 9,001,271 B2
(45) Date of Patent: Apr. 7, 2015

(54) METHOD AND RELATED APPARATUS FOR GENERATING INTERPOLATED FRAME ACCORDING TO SPATIAL RELATIONSHIP RESULT AND TEMPORAL MATCHING DIFFERENCE

(75) Inventors: Chin-Chuan Liang, Taichung (TW); Te-Hao Chang, Taipei (TW); Siou-Shen Lin, Taipei County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 1335 days.

(21) Appl. No.: 12/142,796

(22) Filed: Jun. 20, 2008

(65) Prior Publication Data

US 2009/0316043 A1 Dec. 24, 2009

(51) Int. Cl.
*H04N 7/01* (2006.01)
*H04N 11/20* (2006.01)
*H04N 19/51* (2014.01)

(52) U.S. Cl.
CPC ............... *H04N 7/462* (2013.01); *H04N 7/014* (2013.01); *H04N 7/26861* (2013.01); *H04N 7/362* (2013.01); *H04N 19/00703* (2013.01)

(58) Field of Classification Search
CPC ... H04N 7/462; H04N 7/014; H04N 7/26861; H04N 7/362; H04N 19/703
USPC ............... 348/441, 699, 402.1, 443, 445, 348/448–449, 556–557, 495, 725, 588, 348/524; 375/240.16
See application file for complete search history.

(56) References Cited

U.S. PATENT DOCUMENTS

| 2004/0091046 | A1 | 5/2004 | Akimoto | |
| 2005/0157792 | A1* | 7/2005 | Baba et al. | 375/240.16 |
| 2008/0204592 | A1* | 8/2008 | Jia et al. | 348/402.1 |
| 2009/0316786 | A1* | 12/2009 | Bosma | 375/240.16 |

* cited by examiner

*Primary Examiner* — Nasser Goodarzi
*Assistant Examiner* — An Nguyen
(74) *Attorney, Agent, or Firm* — Winston Hsu; Scott Margo

(57) ABSTRACT

A method for generating an interpolated frame includes: calculating a temporal matching difference corresponding to a target motion vector of a current block by performing a motion estimation on the current block; deriving a spatial relationship result according to the target motion vector and motion vectors corresponding to a plurality of neighboring image blocks; and deriving the interpolated frame according to the target motion vector, the spatial relationship result, and the temporal matching difference.

20 Claims, 2 Drawing Sheets

METHOD AND RELATED APPARATUS FOR GENERATING INTERPOLATED FRAME ACCORDING TO SPATIAL RELATIONSHIP RESULT AND TEMPORAL MATCHING DIFFERENCE

BACKGROUND

The present invention relates to a video processing scheme, and more particularly, to a method and related apparatus for generating an interpolated frame according to a spatial relationship result and a temporal matching difference.

Low display frame rates such as 24 frames per second for film originated signal or 50 fields per second for interlaced video signal often causes display artifact called area flicker. Such display artifact is noticeable on a large display and can be solved by increasing the display frame rate. The frame rate can be raised by various ways of frame interpolation such as frame repetition, frame averaging, and motion-compensated frame interpolation. Motion-compensated frame interpolation is a preferred solution for preventing "motion judder" artifact in scenes with motion. Motion-compensated frame interpolation is a technique of using motion information such as motion vectors to interpolate one or more frames between two original frames. Pixels of an interpolated frame are computed at an intermediate point on a local motion trajectory to avoid discrepancy between an expected image motion and a displayed image motion.

Motion vectors are generated by motion estimation at a pixel level, block level, or object level, and then fed to motion compensated frame interpolator.

SUMMARY

One of the objectives of the present invention is to provide a method and apparatus for generating an interpolated frame according to a spatial relationship result and a temporal matching difference.

According to an embodiment of the present invention, a method for generating an interpolated frame is disclosed. The method comprises the following steps of: calculating a temporal matching difference corresponding to a target motion vector of a current block by performing motion estimation on the current block; deriving a spatial relationship result according to the target motion vector and motion vectors corresponding to a plurality of neighboring image blocks; and deriving the interpolated frame according to the target motion vector, the spatial relationship result, and the temporal matching difference.

According to an embodiment of the present invention, a video processing apparatus for generating a motion compensated interpolated frame is disclosed. The video processing apparatus comprises a motion estimator, a spatial relationship generator, and a motion compensated interpolator. The motion estimator calculates a temporal matching difference corresponding to a target motion vector of a current block. The spatial relationship generator is coupled to the motion estimator and generates a spatial relationship result according to the target motion vector and motion vectors corresponding to a plurality of neighboring image blocks. The motion compensated interpolator is coupled to the spatial relationship generator and the motion estimator, and derives an interpolated frame according to the target motion vector, the spatial relationship result, and the temporal matching difference.

According to an embodiment of the present invention, a video processing apparatus for generating a motion compensated interpolated frame is disclosed. The video processing apparatus comprises a motion estimator, a spatial relationship generator, a spatial relationship enhancer, and a motion compensated interpolator. The motion estimator calculates a temporal matching difference corresponding to a target motion vector of a current block. The spatial relationship generator is coupled to the motion estimator and generates a spatial relationship result according to the target motion vector and motion vectors corresponding to a plurality of neighboring image blocks. The spatial relationship enhancer is coupled to the spatial relationship generator and the motion estimator, and generates an adjusted spatial relationship result based on the temporal matching difference. The motion compensated interpolator is coupled to the spatial relationship enhancer and the motion estimator, and derives an interpolated frame according to the target motion vector and the adjusted spatial relationship result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
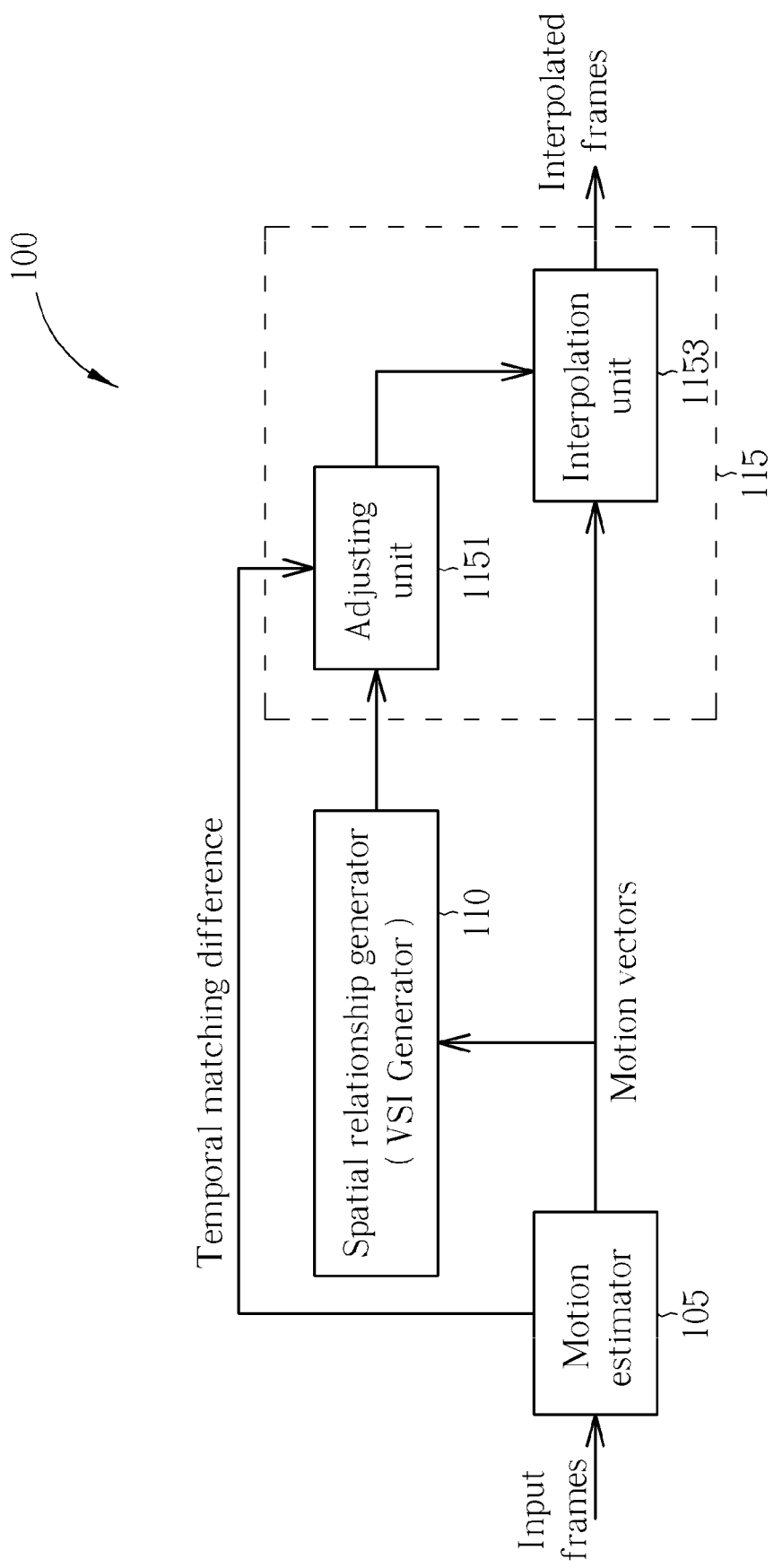
FIG. 1 is a block diagram of an apparatus according to an embodiment of the present invention.

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Usually, determining whether the received motion vectors are reliable or not can be achieved by using a vector spatial result such as a vector spatial inconsistency (VSI) result. Particularly, a motion estimator outputs motion vectors to a VSI generator, and the VSI generator generates a VSI result to a motion compensated interpolator according to the motion vectors; the motion compensated interpolator then evaluates the reliability of the motion vectors by referring to the VSI result. One way to generate the VSI result is to calculate a sum of vector differences between a motion vector of a target image block and the motion vectors of neighboring image blocks. This sum of vector differences, i.e. the VSI result, can indicate whether these motion vectors are smooth or not. For example, in order to decode a target image block positioned in the center of an image area including 3×3 blocks, determining whether motion vectors of image blocks within the image area are smooth or not can be accomplished by referring to a sum of vector differences between a motion vector of the target image block and motion vectors of neighboring image blocks within the image area.

Under some conditions, however, even the motion vector of the above-mentioned target image block may be evaluated as a reliable vector by directly referring to the vector spatial result, quality of an interpolated frame may be still worse, wherein the interpolated frame is generated by the motion compensated interpolator according to the vector spatial result. This is because the vector spatial result is meant to be a spatial result regarding the target motion vector and its neighboring motion vectors while the motion compensated interpolator needs to generate pixel compensated frame(s). In other words, when the quality of the interpolated frame becomes worse due to motion compensation, this does not mean that the vector spatial result indicates the motion vector of the target image block is unreliable. For instance, pixel values of the target image block are enormously different from those of an image block referenced by the target motion vector, while a vector spatial result indicates that this target motion vector and motion vectors of neighboring image blocks are smooth. This may result in a contradiction whether to directly use the target motion vector for interpolation or not.

For avoiding the contradiction, in the following embodiments, an interpolated frame is generated by referring to a temporal matching difference further in addition to the VSI result. Please refer to FIG. 1. FIG. 1 is a block diagram of a video processing apparatus 100 according to an embodiment of the present invention. As shown in FIG. 1, the video processing apparatus 100 includes a motion estimator 105, a spatial relationship generator (e.g. a VSI generator) 110, and a motion compensated interpolator 115. The video processing apparatus 100 evaluates the reliability of target motion vector (s), where the target motion vector(s) is/are used for generating motion compensated interpolated frame(s). For a target motion vector of a current image block, the motion estimator 105 calculates a temporal matching difference corresponding to the target motion vector, and the spatial relationship generator 110, which is coupled to the motion estimator 105, generates a spatial relationship result according to the target motion vector and motion vectors corresponding to a plurality of neighboring image blocks. Next, the motion compensated interpolator 115 derives an interpolated frame according to the target motion vector, the spatial relationship result, and the temporal matching difference. The motion compensated interpolator 115 further comprises an adjusting unit 1151 and an interpolation unit 1153. The adjusting unit 1151 generates a specific value corresponding to the temporal matching difference by utilizing a look-up table, and combines the spatial relationship result with the specific value to output an adjusted spatial relationship result; the adjusted spatial relationship result is an indication of reliability of the target motion vector. The interpolation unit 1153, which is coupled to the adjusting unit 1151, generates the interpolated frame according to the adjusted spatial relationship result. More specifically, the adjusting unit 1151 multiplies the spatial relationship result with the specific value to generate the adjusted spatial relationship result. The interpolation unit 1153 determines that the target motion vector is unreliable when the adjusted spatial relationship result is equal to or higher than a predetermined threshold value, and then excludes the target motion vector when deriving the interpolated frame if the target motion vector is unreliable. Otherwise, the interpolation unit 1153 determines that the target motion vector is reliable when the adjusted spatial relationship result is lower than the predetermined threshold value. Please note that, in this embodiment, the adjusting unit 1151 is positioned within the motion compensated interpolator 115. However, whether the adjusting unit 1151 is positioned within the motion compensated interpolator 115 or not is not meant to be a limitation of the present invention. In another example, the adjusting unit 115 can be positioned outside of the motion compensated interpolator 115; this modification also falls within the scope of the present invention.

In addition, the spatial relationship result in the embodiment is a VSI result; the temporal matching difference is a block matching cost, which is calculated due to the motion estimator 105 performing an SAD (sum of absolute differences) operation, an SAE (sum of absolute errors) operation, an MSE (mean of square errors) operation, an SSE (sum of square errors) operation, or an SSD (sum of square differences) operation, and so forth. Taking the SAD operation as an example, the motion estimator 105 compares a current image block with other image blocks to respectively calculate sums of absolute pixel differences, and takes a minimum sum of absolute pixel differences as a block matching cost. A reference image block corresponding to the minimum sum of absolute pixel differences has the greatest resemblance to the current image block. In order to effectively decode the current image block, the motion estimator 105 determines a vector used for pointing to the reference image block where the vector corresponds to the minimum sum of absolute pixel differences and is called the target motion vector. Thus, the motion estimator 105 can generate target motion vectors utilized for decoding different image blocks, and the target motion vectors correspond to different block matching costs respectively. It should be noted that the SAE operation, MSE operation, SSE operation, and the SSD operation are familiar to those skilled in this art; further explanations are not detailed for conciseness.

Figure 2:
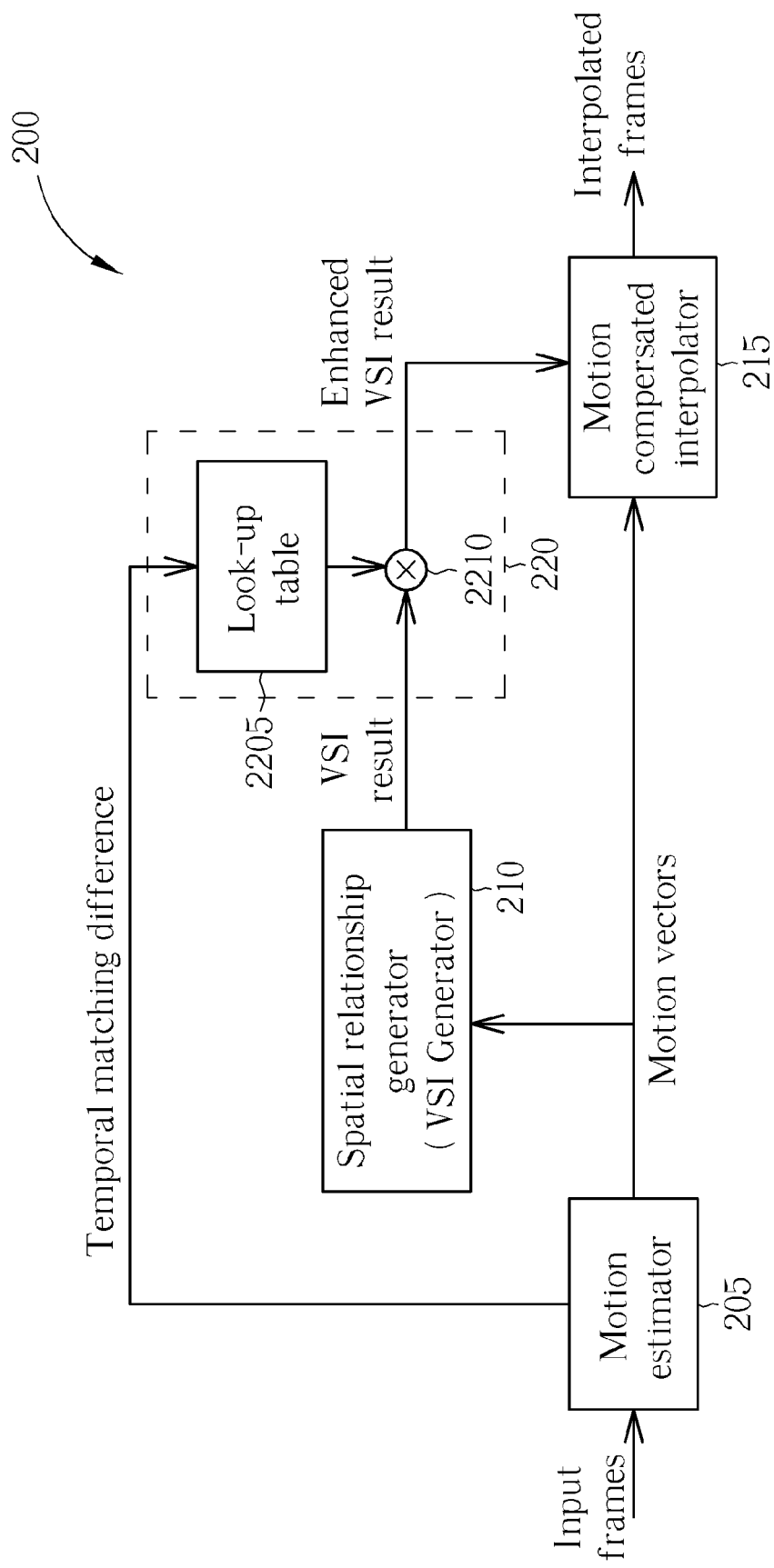
FIG. 2 is a block diagram of a video processing apparatus for generating a motion compensated interpolated frame according to another embodiment of the present invention.

As described above, each target motion vector determined by the motion estimator 105 corresponds to a block matching cost. Through the adjusting unit 1151, the block matching cost is converted into a specific value by referencing the look-up table, where it is assumed that the conversion relation between block matching costs and specific values is a linear relationship and each specific value is equal to or higher than 1. Actually, operation of the adjusting unit 1151 can be replaced by a VSI result enhancer since the adjusted spatial relationship result (i.e. an adjusted VSI result) is a multiplication result of the original VSI result and the specific value. In implementation, the VSI result enhancer can be positioned outside of a motion compensated interpolator. FIG. 2 is a block diagram of a video processing apparatus 200 for generating a motion compensated interpolated frame according to another embodiment of the present invention. The apparatus 200 includes a motion estimator 205, a VSI generator 210, a motion compensated interpolator 215, and a VSI enhancer 220. A difference between the apparatuses 100 and 200 is the VSI enhancer 220 uses a look-up table 2205 and a multiplier 2210 to generate an adjusted/enhanced VSI result based on a temporal matching difference and then the motion compensated interpolator 215 derives an interpolated frame according to a target motion vector and the adjusted VSI result. Thus, it is not required for the motion compensated interpolator 215 to include an adjusting unit further. Since the operations of the motion estimator 205 and VSI generator 210 are similar to those of the motion estimator 105 and VSI generator 110, further description is not explained here for brevity.

Furthermore, in order to reveal the advantages of the present invention more clearly, a problem due to directly referencing the VSI result to generate a motion compensated frame is illustrated in the following. For an example of a plaid shirt displayed on the screen, if the plaid shirt moves slightly, it is possible that motion vectors of an image area corresponding to the plaid shirt are smooth (i.e. a small VSI result $R_1$) but most of the block matching costs corresponding to these motion vectors would be much higher. This is because the plaid shirt has many high-frequency image details (i.e. the plaid); even though the plaid shirt has just shifted slightly, the block matching costs may become higher. If a target motion vector of a current image block among these motion vectors is directly determined as a reliable vector according to the small VSI result $R_1$, there is a high possibility that the quality of the current image block becomes worse since a reference image block pointed by the target motion vector is greatly different from the current image block. This embodiment of the present invention, however, considers effects of the temporal matching difference (i.e. the block matching cost) and spatial relationship result (i.e. the VSI result) together without directly referring to the VSI result, so the video processing apparatus 100 can avoid the above-mentioned problem when generating the motion compensated interpolated frame. In the above example, the adjusting unit 1151 in the video processing apparatus 100 uses the look-up table to generate a specific value $V_1$ corresponding to a block matching cost and then multiplies the small VSI result $R_1$ with the specific value $V_1$ to output an adjusted VSI result $R_1'$. Since the block matching cost actually is much higher as described above, the specific value $V_1$ is also very large. Accordingly, the adjusted VSI result $R_1'$ becomes much larger than the VSI result $R_1$. According to the adjusted VSI result $R_1'$, the interpolation unit 1153 determines that the target motion vector is unreliable if the adjusted VSI result $R_1'$ is equal to or higher than the predetermined threshold value. Next, the video processing apparatus 100 excludes the target motion vector when deriving the interpolated frame and generates the interpolated frame in another way to avoid decreasing the quality of the interpolated frame.

Additionally, another conventional scheme may only check whether a block matching cost corresponding to a target motion vector is higher than a threshold value, to determine the reliability of the target motion vector. If the block matching cost is higher than the threshold value, it means that an image block referenced by the target motion vector for decoding is different from a target image block. The target motion vector is regarded as an unreliable motion vector. This conventional scheme meets a serious problem: the block matching cost may be just slightly higher than the threshold value (i.e. the target motion vector will be determined as an unreliable vector) but actually using the target motion vector for decoding can also produce frames having an acceptable image quality (i.e. actually the target motion vector can be determined as a reliable vector without being post-processed). This problem is not introduced in this embodiment of the present invention since the video processing apparatus 100 considers the effects of the block matching cost and VSI result together without directly referencing the block matching cost. Thus, the apparatus 100 can avoid the problem described above when generating the interpolated frame. The operation of the apparatus 100 is illustrated in the foregoing paragraphs; further description is not detailed here for brevity.

Those skilled in the art will readily observe that numerous modifications and alterations of the device and method may be made while retaining the teachings of the invention.

What is claimed is:

1. A method for generating an interpolated frame, the method comprising:
    calculating a plurality of motion vectors;
    calculating a temporal matching difference corresponding to a target motion vector of a current block by performing a motion estimation on the current block, wherein calculating the temporal matching difference is performed during or after calculating the plurality of motion vectors;
    deriving a spatial relationship result according to the target motion vector and motion vectors corresponding to a plurality of neighboring image blocks, wherein deriving the spatial relationship result is performed after calculating the target motion vector;
    deriving an adjusted spatial relationship result according to the temporal matching difference and the spatial relationship result; and
    generating the interpolated frame according to the target motion vector and the adjusted spatial relationship result.

2. The method of claim 1, wherein the temporal matching difference is a block matching cost.

3. The method of claim 2, wherein the block matching cost is a result of an SAD (sum of absolute differences) operation, an SAE (sum of absolute errors) operation, an MSE (mean of square errors) operation, an SSE (sum of square errors) operation, or an SSD (sum of square differences) operation of the current block and a reference block pointed by the target motion vector.

4. The method of claim 1, wherein the spatial relationship result is a vector spatial inconsistency (VSI) result.

5. The method of claim 1, wherein the step of deriving the adjusted spatial relationship comprises:
    generating a specific value corresponding to the temporal matching difference by utilizing a look-up table; and
    combining the spatial relationship result with the specific value to output an adjusted spatial relationship result;
    wherein the adjusted spatial relationship is an indication of reliability of the target motion vector.

6. The method of claim 5, wherein the step of combining the spatial relationship result with the specific value to output the adjusted spatial relationship result comprises:
    multiplying the spatial relationship result with the specific value to generate the adjusted spatial relationship result.

7. The method of claim 1, wherein the step of generating the interpolated frame comprises:
    comparing the adjusted spatial relationship result to a predetermined threshold value;
    determining that the target motion vector is unreliable and excluding the target motion vector from the derivation of the interpolated frame if the adjusted spatial relationship result is equal to or higher than the predetermined threshold value.

8. A video processing apparatus for generating a motion compensated interpolated frame, the apparatus comprising:
    a motion estimator, calculating a temporal matching difference corresponding to a target motion vector of a current block;
    a spatial relationship generator, directly coupled to the motion estimator, generating a spatial relationship result according to the target motion vector and motion vectors corresponding to a plurality of neighboring image blocks; and
    a motion compensated interpolator, directly coupled to both the spatial relationship generator and the motion estimator, deriving an interpolated frame according to the target motion vector, the spatial relationship result, and the temporal matching difference;
    wherein the motion compensated interpolator comprises:
    an adjusting unit, generating an adjusted spatial relationship result based on the temporal matching difference; and an interpolation unit, directly coupled to the adjusting unit, generating the interpolated frame according to the adjusted spatial relationship result.

9. The apparatus of claim 8, wherein the temporal matching difference is a block matching cost.

10. The apparatus of claim 9, wherein the motion estimator performs an SAD (sum of absolute differences) operation, an SAE (sum of absolute errors) operation, an MSE (mean of square errors) operation, an SSE (sum of square errors) operation, or an SSD (sum of square differences) operation on the current block and a reference block pointed by the target motion vector, to calculate the block matching cost.

11. The apparatus of claim 8, wherein the spatial relationship result is a vector spatial inconsistency (VSI) result.

12. The apparatus of claim 8, wherein the adjusting unit generates a specific value corresponding to the temporal matching difference by utilizing a look-up table and combining the spatial relationship result with the specific value to output the adjusted spatial relationship result, wherein the adjusted spatial relationship is an indication of reliability of the target motion vector.

13. The apparatus of claim 12, wherein the adjusting unit multiplies the spatial relationship result with the specific value to generate the adjusted spatial relationship result.

14. The apparatus of claim 8, wherein the interpolation unit determines that the target motion vector is unreliable when the adjusted spatial relationship result is equal to or higher than a predetermined threshold value, and excludes the target motion vector when deriving the interpolated frame if the target motion vector is unreliable.

15. A video processing apparatus, generating a motion compensated interpolated frame, the apparatus comprising:
a motion estimator, calculating a temporal matching difference corresponding to a target motion vector of a current block;
a spatial relationship generator, directly coupled to the motion estimator, generating a spatial relationship result according to the target motion vector and motion vectors corresponding to a plurality of neighboring image blocks;
a spatial relationship enhancer, directly coupled to both the spatial relationship generator and the motion estimator, generating an adjusted spatial relationship result based on the temporal matching difference; and
a motion compensated interpolator, directly coupled to both the spatial relationship enhancer and the motion estimator, deriving an interpolated frame according to the target motion vector and the adjusted spatial relationship result.

16. The apparatus of claim 15, wherein the temporal matching difference is a block matching cost.

17. The apparatus of claim 16, wherein the motion estimator performs an SAD (sum of absolute differences) operation, an SAE (sum of absolute errors) operation, an MSE (mean of square errors) operation, an SSE (sum of square errors) operation, or an SSD (sum of square differences) operation on the current block and a reference block pointed by the target motion vector, to calculate the block matching cost.

18. The apparatus of claim 15, wherein the spatial relationship result is a vector spatial inconsistency (VSI) result.

19. The apparatus of claim 15, wherein the spatial relationship enhancer generates a specific value corresponding to the temporal matching difference by utilizing a look-up table, and combining the spatial relationship result with the specific value to output the adjusted spatial relationship result.

20. The apparatus of claim 19, wherein the spatial relationship enhancer multiplies the spatial relationship result with the specific value to generate the adjusted spatial relationship result.

* * * * *